United States Patent
Bui

(10) Patent No.: US 7,209,627 B2
(45) Date of Patent: Apr. 24, 2007

(54) LIGHTPIPE WITH MULTIPLE PROJECTIONS

(75) Inventor: An Hong Bui, Milpitas, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 169 days.

(21) Appl. No.: 10/930,287

(22) Filed: Aug. 31, 2004

(65) Prior Publication Data

US 2006/0044819 A1     Mar. 2, 2006

(51) Int. Cl.
*G02B 6/10* (2006.01)

(52) U.S. Cl. .................. 385/146; 385/901; 385/36; 362/606; 362/607; 362/620

(58) Field of Classification Search ............... 385/146, 385/901, 36, 129, 130, 131; 362/606, 607, 362/620
See application file for complete search history.

(56) References Cited

U.S. PATENT DOCUMENTS

| | | | |
|---|---|---|---|
| 4,191,943 A | 3/1980 | Cairns et al. | 313/112 |
| 4,787,708 A * | 11/1988 | Whitehead | 385/133 |
| 5,349,504 A | 9/1994 | Simms et al. | 362/32 |
| 5,396,350 A * | 3/1995 | Beeson et al. | 349/62 |
| 5,515,244 A | 5/1996 | Levinson et al. | 362/32 |
| 5,587,882 A | 12/1996 | Patel | 361/705 |
| 5,771,328 A * | 6/1998 | Wortman et al. | 385/146 |
| 5,988,842 A | 11/1999 | Johnsen et al. | 362/551 |
| 5,995,690 A * | 11/1999 | Kotz et al. | 385/25 |
| 6,462,951 B2 | 10/2002 | Letourneau | 361/704 |
| 6,481,882 B1* | 11/2002 | Pojar | 362/559 |
| 6,549,411 B1 | 4/2003 | Herbert | 361/704 |
| 6,685,351 B2 | 2/2004 | Chen | 385/60 |
| 6,724,628 B2 | 4/2004 | Franz et al. | 361/704 |
| 6,746,270 B2 | 6/2004 | Peterson et al. | 439/487 |
| 2001/0030857 A1* | 10/2001 | Futhey et al. | 362/31 |

FOREIGN PATENT DOCUMENTS

| | | | |
|---|---|---|---|
| DE | 29613798 | 1/1999 | 385/901 X |
| EP | 0600158 | 6/1994 | 385/901 X |

* cited by examiner

*Primary Examiner*—Brian M. Healy

(57) ABSTRACT

A lightpipe includes at least first and second projections extending outwardly from the body of the lightpipe, where the first projection is opposite the second projection.

32 Claims, 1 Drawing Sheet

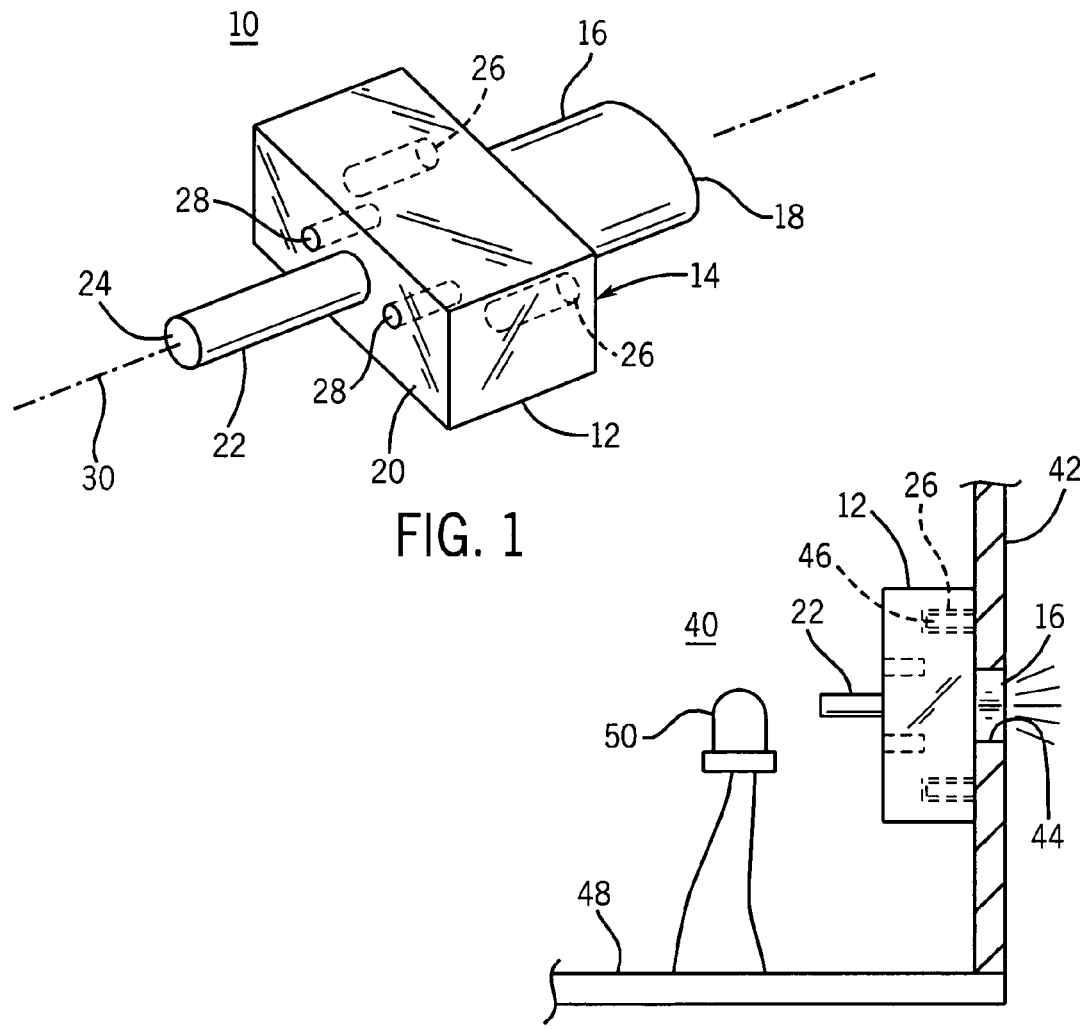
FIG. 1
FIG. 2
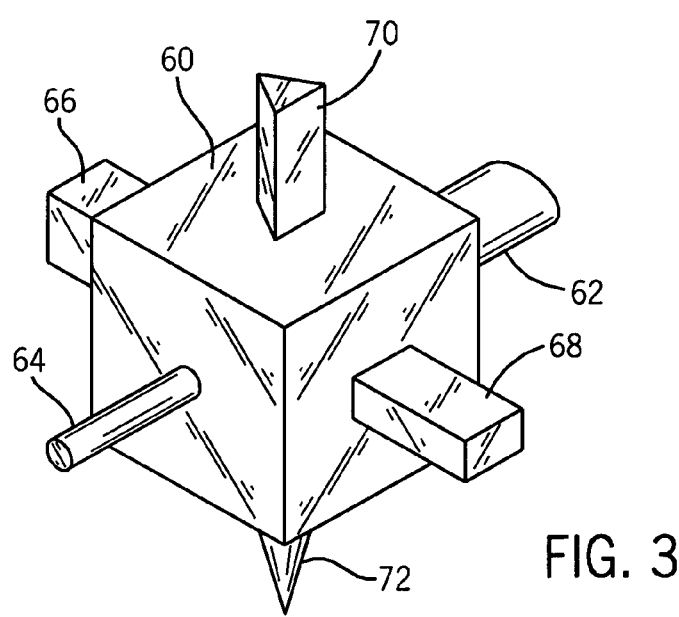
FIG. 3

LIGHTPIPE WITH MULTIPLE PROJECTIONS

BACKGROUND

This invention is generally directed to the display of a visual signal and is more specifically directed to the display of the visual signal using a lightpipe with multiple projections.

Visual signals are utilized on various types of electronic equipment to convey information to the user about a status or condition associated with the electronic equipment. For example, a light emitting diode (LED) disposed in an aperture in a panel or case of an electronic device can be selectively activated to provide a light indicative of a condition. A small incandescent bulb disposed behind a colored lens in an aperture of a panel of an electronic device has also been utilized to provide a visual signal to the user. Further comments on the prior art contrasted to implementations of the present invention are in the beginning of the Detailed Description section.

SUMMARY

The invention in one implementation encompasses an apparatus including a lightpipe with at least first and second outwardly extending projections. The second projection extends outwardly from a body portion of the lightpipe in a direction different from the first projection. The first and second projections have distal ends configured to produce different geometric illumination patterns.

The invention in another implementation encompasses an electronic apparatus including a lightpipe such as described in the preceding paragraph. A panel has an aperture dimensioned to receive the first projection. A light source is disposed substantially adjacent the lightpipe such that illumination from the light source is conducted through the lightpipe to illuminate the first projection.

DESCRIPTION OF THE DRAWINGS

Features of exemplary implementations of the invention will become apparent from the description, the claims and the accompanying drawings in which:

FIG. 1 illustrates an embodiment of a lightpipe in accordance with the present invention.

FIG. 2 illustrates a further embodiment of the present invention in which an electronic apparatus includes a lightpipe and light source.

FIG. 3 illustrates a yet further embodiment of a lightpipe in accordance with the present invention having more than two projections.

DETAILED DESCRIPTION

One aspect of the present invention resides in the recognition of deficiencies in previous lightpipes utilized to convey a visual signal to user. Previous lightpipes typically had a body portion from which extended a single projection of a given geometric shape. It is desirable to be able to provide users with differentiated visual indicia by presenting different illuminated geometric shapes associated with different conditions or with different products. A separate lightpipe was required for each different visual indicia in the prior art. If a lightpipe in the prior art is injection molded, a different mold is required to produce each different lightpipe. Thus, employing different visual indicia with different geometric shapes requires the use of a plurality of corresponding molds in accordance with the prior art. Additionally, each such lightpipe must be separately stocked and maintained in inventory. Therefore, employing a number of known lightpipes, each with a single different geometric projection, has disadvantages such as increased costs associated with the requirement for different molds, separate inventorying and manufacturing costs associated with handling and installing each different type of lightpipe. It is a goal of the present invention to minimize these disadvantages.

FIG. 1 illustrates an embodiment of a lightpipe 10 in accordance with the present invention. The lightpipe 10 may be made of a substantially transparent or translucent plastic material, preferably formed by injection molding to form a single unitary construction. A body 12 includes a planar surface 14 from which a first projection 16 extends outwardly substantially perpendicular to surface 14. The first projection 16 includes a distal end 18 and has an oval cross-section in a plane parallel to surface 14. Planar surface 20 is parallel to and opposes surface 14. A second projection 22 extends outwardly substantially perpendicular to surface 20 and has a distal end 24. The projection 22 is generally cylindrical and hence has a circular cross-section in a plane parallel to surface 20. It is generally preferable that surfaces 14 and 20 extend laterally beyond the respective projections so that the surface associated with the projection to be displayed to the user provides an abutment that serves to position the lightpipe against a panel or case of the electronic equipment to which the lightpipe is mounted. Projections 16 and 22 have distal ends configured to produce different geometric illumination patterns so that the user can easily perceive different visual signals depending on which projection is seen by the user.

Recesses 26 disposed in surface 14 and recesses 28 disposed in surface 20 serve as part of a keying mechanism in combination with similarly dimensioned rods that extend from the panel to which the lightpipe is to be mounted. The spaced-apart recesses and the corresponding rods may be dimensioned to form a press fit securing the lightpipe 10 to the panel so that the corresponding projection 16 or 22 extends through an aperture in the panel. The recesses 26 and 28 preferably have a different spacing so that the lightpipe 10 to provide a keying function so that it can only be seated over the rods with the desired projection 16 or 22 oriented to be displayed through the aperture in the panel to the user.

In the illustrative embodiment of lightpipe 10, a centerline axis 30 forms an axial centerline through cylindrical projection 22, body 12 and the oval projection 16. Since either of the projections of the lightpipe can be selected to be mounted to the panel of the corresponding electronic equipment to be viewed by the user through a corresponding aperture, the distal ends 18 and 24 of the projections should be capable of accepting and disbursing light received from a light source. It may be preferable that the remainder of the surfaces of the lightpipe 10 be disposed to substantially reflect internal light. For example, these other surfaces of the lightpipe 10 may be formed with a texture or have a coating that will tend to reflect light impinging upon the surfaces from the interior of the lightpipe. This will minimize the loss of light and maximize the light intensity as seen by the user. As will be explained more fully with regard to FIG. 2, a source of light is preferably disposed along the centerline 30 substantially adjacent to the distal end 18 or 24 not extending through the aperture in the panel, i.e. adjacent a distal end not being utilized for display to the user. This provides a straight-line path for at least the portion of the light from the source so that it can pass directly from the light receiving distal end to the other distal end from which the light emerges. Projections 16 and 22 are examples of first and second means associated with the body for producing a first and second geometric illumination patterns in first and second directions extending outwardly and orthogonal to each other. As used herein, an "orthogonal" direction refers to a direction being substantially 90 degrees or an integer multiple of 90 degrees different to another direction, and includes 180 degrees, i.e. in an opposing direction.

FIG. 2 shows the lightpipe 10 installed in an exemplary environment of an electronic device 40. A front panel 42 of the device 40 includes an aperture 44 dimensioned to receive a projection from the lightpipe, in this example projection 16. A "panel" as used herein includes all enclosures, cases and surfaces of an electronic device that can be viewed by the user. A pair of rods 46 extend from the inside surface of panel 42. The rods are spaced and dimensioned to be received by recesses 26. This provides a keying mechanism to allow only the desired projection of the lightpipe to be inserted into aperture 44 and also provides a means for mounting the lightpipe to the panel. A printed circuit board 48 supports various functions of the electrical device and includes a source of light 50, e.g. a light emitting diode (LED), that is preferably aligned with the centerline 30 and adjacent the distal end 24 of the projection opposing the projection 16. The lightpipe conducts light from light source 50 to the distal end 18 of projection 16 so that the illumination of distal end 18 provides a visual signal to the user of device 40. The source of light 50 is controlled by other circuitry (not shown) so that the illumination/non-illumination of projection 16 corresponds to visual signal indicative of a status or condition associated with the device 40.

FIG. 3 shows a further embodiment of a lightpipe 60 in accordance with the present invention. In this illustrative embodiment the lightpipe has a generally cubic body with 3 sets of opposing planar surfaces. Each of the 6 planar surfaces contains a projection that extends outwardly substantially perpendicular to the respective surface. The exemplary geometric shapes of the projections are all different. Projection 62 is an elongated oval; projection 64 is cylindrical; projection 66 is an elongated square cross-section; projection 68 is an elongated rectangular cross-section; projection 70 is an elongated triangular cross-section; projection 72 is a cone. Recesses (not shown on lightpipe 60) similar to those shown for lightpipe 10 can be employed to provide a keying function as well as mounting. Lightpipe 60 illustrates that a lightpipe with more than 2 projections can be accommodated in a single lightpipe. To minimize light loss, the body of the lightpipe can be constructed or treated with a material or coating to substantially reflect internal light with the lightpipe. The distal ends of the unused projections, projections other than the user facing projection and the one opposite it, can also be treated to minimize light loss.

Although embodiments of the present invention have been described, it will be apparent to those skilled in the art that various changes and modifications can be made without departing from the scope of the present invention. For example, the body of the lightpipe may comprise other than a rectangular solid shape, i.e. outside surfaces may not all be planar surfaces. Various mounting means can be used to mount the lightpipe to a panel, case or printed circuit board of an electrical device that may include any type of device capable of controlling a visual indicator. Light sources of various types can supply light to the lightpipe from orientations other than along the centerline of the projection opposing the projections viewed by the user. A second projection could be disposed other than 180 degrees opposite to a first projection, e.g. the second projection could be 90 degrees relative to the first projection. These suggested variations are merely exemplary of modifications and are not intended to exclude other modifications.

What is claimed is:

1. A visual display apparatus comprising:
   a lightpipe having a body portion;
   a first projection extending outwardly from the body portion;
   a second projection extending outwardly from the body portion in a direction different from the first projection, the first and second projections having distal ends configured to produce different geometric illumination patterns;
   the body portion comprising a first planar surface and second planar surface parallel to the first planar surface, the first and second projections extending from the first and second planar surfaces, respectively; and
   at least the first planar surface includes a keying mechanism that assists in aligning the first projection with an aperture in a panel to which the lightpipe is mounted.

2. The apparatus of claim 1 wherein the distal ends are disposed to accommodate the transmission of light.

3. The apparatus of claim 1 wherein the keying mechanism comprises at least two spaced-apart recesses in the lightpipe body portion dimensioned to receive and align with two spaced-apart rods on the panel.

4. The apparatus of claim 1 wherein the first and second projections have a common centerline.

5. The apparatus of claim 1 further comprising a panel with an aperture dimensioned to receive the first projection, and a source of light located to provide illumination into the lightpipe.

6. The apparatus of claim 5 wherein the source of light is mounted substantially adjacent a distal end of the second projection.

7. The apparatus of claim 6 wherein the first and second projections have a common centerline.

8. The apparatus of claim 7 wherein the distal ends are disposed to accommodate the transmission of light.

9. The apparatus of claim 1 wherein the keying mechanism comprises at least two spaced-apart recesses in the lightpipe body portion dimensioned to receive two spaced-apart rods on the panel.

10. The apparatus of claim 1 wherein at least the surfaces of the body portion reflect internal light rays to reduce the loss of light.

11. The apparatus of claim 5 wherein the source of light comprises a light emitting diode.

12. The apparatus of claim 1 wherein the different geometric shapes comprise each projection having a different cross-sectional two dimensional shape.

13. The apparatus of claim 1 wherein the body portion and projections are molded of the same material as a single unitary construction.

14. An electronic apparatus having a visual display comprising:
   a panel with an aperture;
   a lightpipe having a body portion;
   a first projection extending outwardly from the body portion;
   a second projection extending outwardly from the body portion in a direction opposite the first projection, the first and second projections having distal ends configured to produce different geometric illumination patterns;

means for mounting the lightpipe so that the first projection extends through the aperture;

source of light mounted adjacent the lightpipe so as to provide illumination into the lightpipe to cause at least a distal end of the first projection to emit light;

the body portion comprising a first planar surface and second planar surface parallel to the first planar surface, the first and second projections extending from the first and second planar surfaces, respectively; and at least the first planar surface includes a keying mechanism that assists in aligning the first projection with an aperture in a panel to which the lightpipe is mounted.

15. The apparatus of claim 14 wherein the distal ends are disposed to accommodate the transmission of light.

16. The apparatus of claim 14 wherein the keying mechanism comprises at least two spaced-apart recesses in the lightpipe body portion dimensioned to receive and align with two spaced-apart rods on the panel.

17. The apparatus of claim 14 wherein the first and second projections have a common centerline.

18. The apparatus of claim 14 wherein the source of light is mounted substantially adjacent a distal end of the second projection.

19. The apparatus of claim 18 wherein the first and second projections have a common centerline.

20. The apparatus of claim 14 wherein at least the surfaces of the body portion reflect internal light rays to reduce the loss of light.

21. The apparatus of claim 14 wherein the source of light comprises a light emitting diode.

22. The apparatus of claim 14 wherein the different geometric shapes comprise each projection having a different cross-sectional two dimensional shape.

23. The apparatus of claim 14 wherein the body portion and projections are molded of the same material as a single unitary construction.

24. A visual display apparatus comprising:
a lightpipe having a body portion;
at least first, second, third and fourth projections each extending outwardly from the body portion;
the second projection extending outwardly from the body portion in a direction opposite the first projection, the fourth projection extending outwardly from the body portion in a direction opposite the third projection, all of said projections each having different geometric shapes;
the body portion comprising a first planar surface and second planar surface parallel to the first planar surface, the first and second projections extending form the first and second planar surfaces, respectively, a third planar surface and fourth planar surface parallel to the third planar surface, the third and fourth projections extending from the third and fourth planar surfaces, respectively; and
at least the first planar surface includes a keying mechanism that assists in aligning the first projection with an aperture in a panel to which the lightpipe is mounted.

25. The apparatus of claim 24 wherein each of said projections have a distal end disposed to accommodate the transmission of light.

26. The apparatus of claim 24 wherein the keying mechanism comprises at least two spaced-apart recesses in the lightpipe body portion dimensioned to receive and align with two spaced-apart rods on the panel.

27. The apparatus of claim 24 wherein the first and second projections have a first common centerline, and the third and fourth projections have a second common centerline.

28. The apparatus of claim 24 wherein the body portion and projections are molded of the same material as a single unitary construction.

29. A visual display apparatus comprising:
a lightpipe having a body portion;
a first means associated with the body for producing a first geometric illumination pattern in a first direction extending outwardly from the body portion; and
a second means associated with the body for producing a second geometric illumination pattern in a second direction extending outwardly from the body portion, the second direction being substantially orthogonal to the first direction;
the body portion comprising a first planar surface and second planar surface parallel to the first planar surface, the first and second means extending from the first and second planar surfaces respectively, and
at least the first planar surface includes a keying mechanism that assists in aligning the first means with an aperture in a panel which the lightpipe is mounted.

30. The apparatus of claim 29 wherein the first and second means each comprise a projection with a distal end disposed to accommodate the transmission of light.

31. The apparatus of claim 29 wherein the keying mechanism comprises at least two spaced-apart recesses in the lightpipe body portion dimensioned to receive and align with two spaced-apart rods on the panel.

32. The apparatus of claim 29 wherein the first and second means have a common centerline.

* * * * *